D. P. KELLOGG.
COMPOSITE TOOL OF THE REVOLUBLE TYPE AND METHOD OF MAKING THE SAME.
APPLICATION FILED MAR. 30, 1917.

1,327,101.

Patented Jan. 6, 1920.
3 SHEETS—SHEET 1.

INVENTOR
Daniel P. Kellogg
BY
Barnett & Numan
ATTORNEYS.

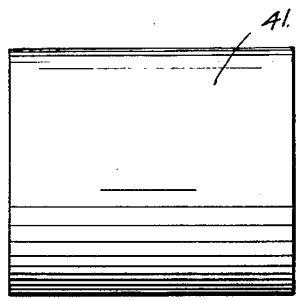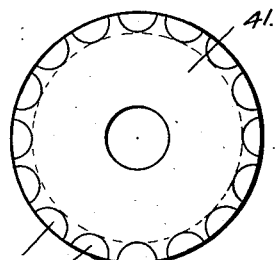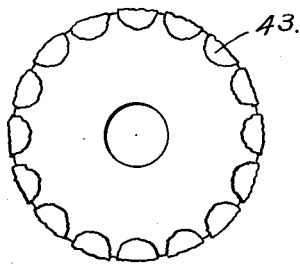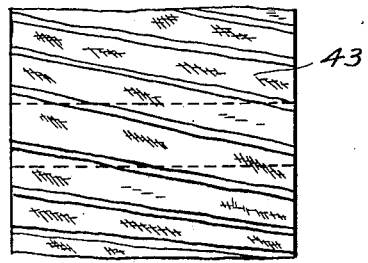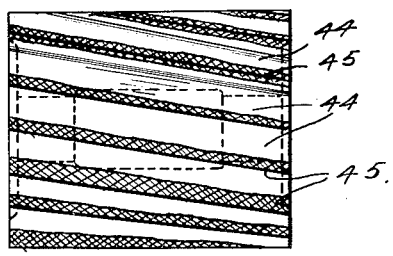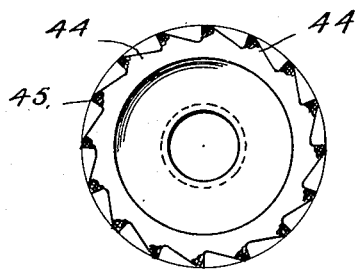

D. P. KELLOGG.
COMPOSITE TOOL OF THE REVOLUBLE TYPE AND METHOD OF MAKING THE SAME.
APPLICATION FILED MAR. 30, 1917.

1,327,101.

Patented Jan. 6, 1920.
3 SHEETS—SHEET 3.

INVENTOR
Daniel P. Kellogg
BY
Barnett Jurman
ATTORNEYS.

UNITED STATES PATENT OFFICE.

DANIEL P. KELLOGG, OF LOS ANGELES, CALIFORNIA.

COMPOSITE TOOL OF THE REVOLUBLE TYPE AND METHOD OF MAKING THE SAME.

1,327,101.  Specification of Letters Patent.  Patented Jan. 6, 1920.

Application filed March 30, 1917. Serial No. 158,598.

*To all whom it may concern:*

Be it known that I, DANIEL P. KELLOGG, a citizen of the United States, residing at Los Angeles, in the county of Los Angeles and State of California, have invented certain new and useful Improvements in Composite Tools of the Revoluble Type and Methods of Making the Same, of which the following is a specification.

My invention relates to the production of tools, machine elements, or the like, generally cylindrical or conical in shape, of the revoluble type (by which is meant a tool which either revolves when in use or which is held stationary and the work revolved in respect thereto) such as reamers, pipe taps and milling tools.

The object of the invention is to provide a tool of this character composed of a stock or body of relatively soft metal, steel, for example, provided with cutting edges, the contour and disposition of which may differ considerably, of one of the alloys variously known as "high speed" or "air hardening" or "self-hardening" steel, which, for convenience, will be referred to herein as "high speed" steel.

High speed steel is expensive, and for this reason and because of its brittleness and liability to fracture, a composite tool of the type above mentioned, composed largely of soft, tough steel, is a highly desirable article, provided the tool can be made at a reasonable cost and in such manner as to satisfactorily withstand the stresses to which it is likely to be subjected when put into service.

I do claim herein, in its more generic aspects, the method of welding the high speed steel to the soft metal stock which will be hereinafter described; as such methods, broadly speaking, have been described and claimed in the joint application of myself and others, Serial No. 57,767, filed October 25, 1915, and my co-pending application Serial No. 158,595 filed March 30, 1917. The present application has to do with the application of the general principles of the broader inventions to the special problems involved in making tools, machine elements, or the like of the particular type shown and described in this application.

The invention is illustrated, in certain preferred embodiments, in the accompanying drawings, wherein—

Fig. 9 shows the blank from which a composite milling cutter is to be made.

Fig. 10 is a side view and Fig. 11 an end view of the blank after it has been fluted or grooved.

Fig. 12 is a side view and Fig. 13 an end view of the blank after the grooves have been filled with high speed steel.

Fig. 14 is a side view and Fig. 15 an end view of the finished tool.

Like characters of reference designate like parts in the several figures of the drawings.

Figure 1:
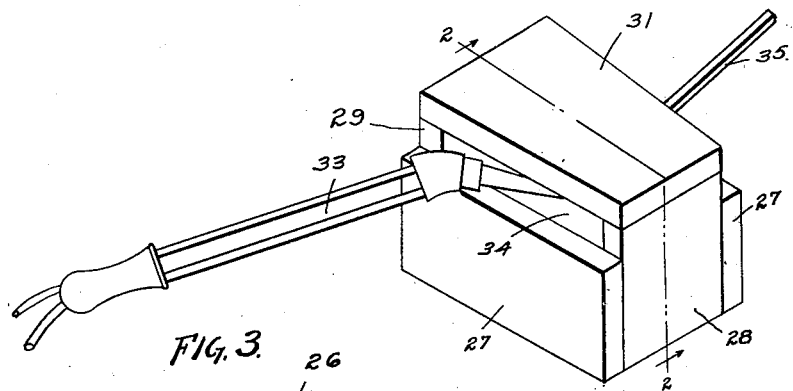
Figure 1 is a view, in perspective, illustrating the method of and apparatus for uniting the high speed steel facings to the common steel stock in the manufacture of a pipe tap.
Figure 3:
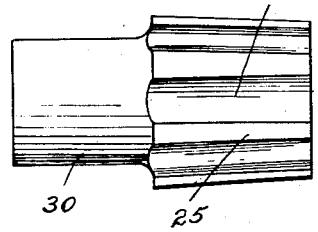
Fig. 3 is a side view of the common steel stock prepared to receive the high speed steel facings.
Figure 2:
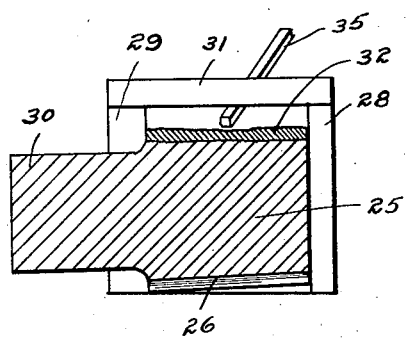
Fig. 2 is a sectional view on line 2—2 of Fig. 1.

Referring first to Figs. 1 to 8 inclusive, the common steel stock 25 is formed with a plurality of longitudinal grooves 26. The stock is then inclosed in a furnace or retort which is composed preferably of refractory bricks or blocks built up around the stock in the manner indicated in Figs. 1 and 2. 27 are side blocks and 28, 29 end blocks, the shank 30 of the stock passing through an opening in end block 29. 31 is a cover block. Before the blank is put into the retort it is preferably preheated, in a forging furnace, for example, and any suitable means (not shown) may be employed for keeping it hot during the welding operation.

The method of welding the high speed steel bodies or facings 32 in the grooves 26 is as follows: The surface of the groove is first fused by means preferably of an oxy-acetylene flame, or other high temperature flame of the oxy-acetylene type, the torch 33 being thrust through one of the openings 34 which intervenes between the side blocks 27 of the retort and the cover block 31. The operator then thrusts a weld stick 35 of high speed steel, which preferably has been pre-heated, through the opposite opening in the retort and melts off the end of the same and flows the melted steel into the groove in the stock. When one groove has been filled in this way the stock is turned so as to expose the next groove, and the operation repeated.

It is preferable, in certain operations that the fusing of the metals should take place in a substantially inclosed space. In some cases if the operation be performed in the open air the surface of the molten metal is likely to swell and the metal become blistered and porous in its character. In effect, I preferably provide a flame chamber which is completely filled with flame from the torch so that air is excluded from contact with the metal while in molten condition. When the groove has been filled with high speed steel the torch is withdrawn gradually so that air will not come in contact with the metal until the latter has had a chance to cool and congeal to a certain extent. It is desirable, when the torch is removed from the retort, to scatter powdered charcoal, coal or coke, or other finely divided material over the high speed steel deposit. This protects the same from the air during the cooling operation. Preferably the flame from the torch is not projected directly against the metals operated upon, particularly in melting the high speed steel. This is to avoid oxidation. The melting of the metal is accomplished by reverberation of the flames from the walls of the retort.

Figure 4:
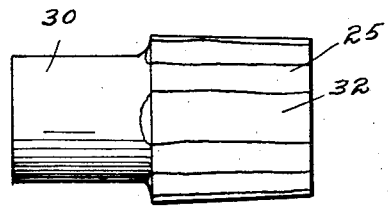
Fig. 4 is a side elevation of the stock with the high speed steel united thereto.
Figure 5:
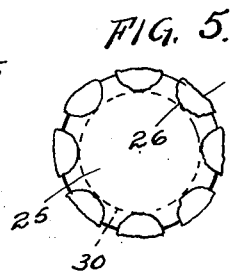
Fig. 5 is an end view of the article shown in Fig. 4.
Figure 6:
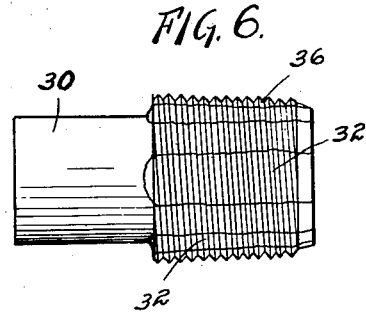
Fig. 6 illustrates the next step in the process, viz. the threading of the composite blank.
Figure 7:
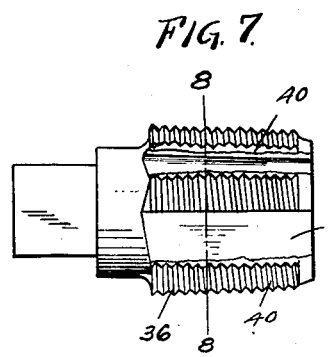
Fig. 7 is a side view and Fig. 8 a sectional view on line 8—8 of Fig. 7, illustrating the finished tool.
Figure 8:
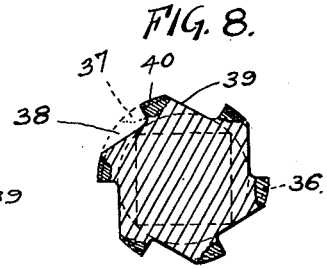

Figs. 4 and 5 show the composite blank after the bodies of high speed steel have been united to the common steel stock. The next operation is to form the blank with a threading 36 (Fig. 6), which may be accomplished by any suitable apparatus, commonly used for threading pipe tapping tools. After the blank has been threaded it is fluted or grooved. That is to say, the blank is cut into on radial lines with respect to the axis of the tool. This removes about half of each body of high speed steel, as indicated by the dotted lines at 37 (Fig. 8), and also the adjacent portion 38 of the stock. In effect, the stock is formed with teeth or projections 39 which are generally triangular in cross section and are tipped with strips 40 also generally triangular in cross section, of the high speed steel. The high speed steel bodies are united to the forward faces of the projections 39, forward with respect to the intended direction of revolution of the tool, so that the cutting stresses on the high speed steel bodies 40 are taken up by the projections formed on the integral stock which, being of relatively soft steel, is less subject to fracture than is high speed steel.

Figs. 9 to 15 inclusive, illustrate the application of this method to a milling cutter in which the cutting edges are formed on spiral lines. The soft steel blank 41 (Fig. 9) is fluted spirally (Figs. 10 and 11) forming a plurality of channels 42. These channels are filled with bodies of high speed steel 43 (Figs. 12 and 13) which are welded to the blank by an operation substantially like the welding operation above described in connection with the pipe tap. The composite blank is then fluted on spiral lines so that the finished tool (Figs. 14 and 15) is provided with a number of spiral teeth 44 tipped with strips or bodies of high speed steel providing the cutting edges of the device, the high speed steel lying on the forward faces of the teeth so that the high speed steel and the welds between it and the stock are reinforced and fortified against the stresses developed when the tool is used.

Figure 16:
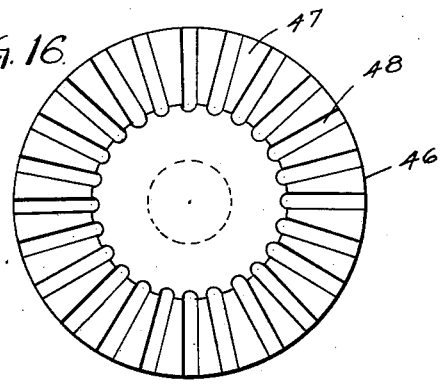
Fig. 16 is an end view and Fig. 17 a side view of a soft steel blank prepared for the high speed steel bits or facings in the manufacture of a pipe reamer.
Figure 17:
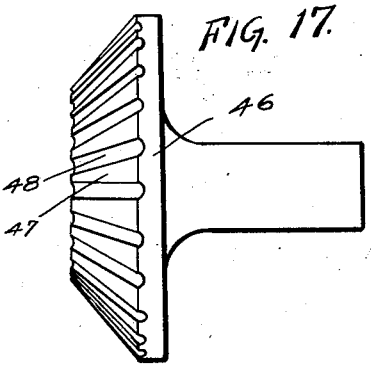
Figure 18:
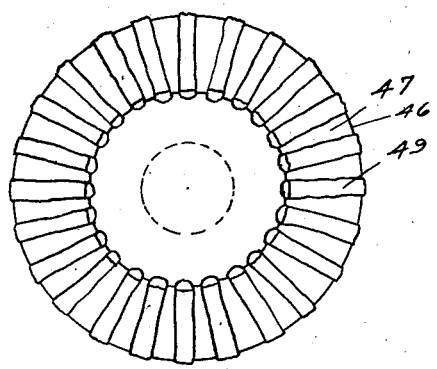
Fig. 18 is an end view of the composite blank after the high speed steel has been welded to the stock.
Figure 19:
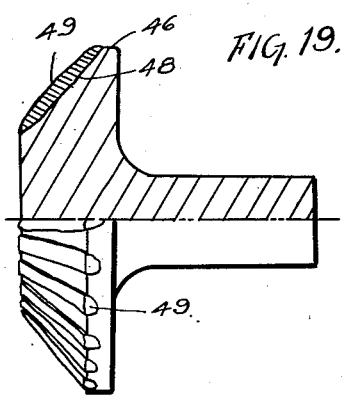
Fig. 19 is a side view, partly in section and partly in elevation, of the same.
Figure 20:
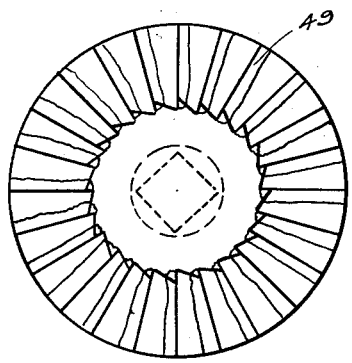
Fig. 20 is an end view and Fig. 21 a side view of the finished tool.
Figure 21:
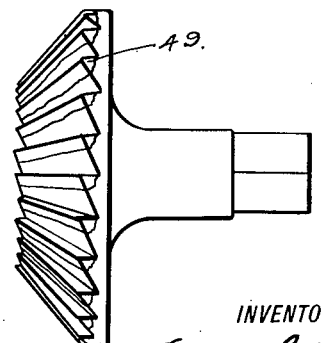

Figs. 16 to 21 inclusive, show the application of the method to the manufacture of a pipe reamer having a conical face. The blank 46 forming the stock of the tool has cut in its face 47 a plurality of radial grooves 48 (Figs. 16 and 17). These grooves are filled with bodies of high speed steel 49 (Figs. 18 and 19). The blank is then cut away as indicated in Figs. 20 and 21 which show the finished tool.

I claim:

1. The method of manufacturing a composite tool of the type described which consists in forming the stock with grooves, welding bodies of high speed steel into said grooves by fusing the surfaces of the stock and melting the high speed steel to fluidity by means of a gas flame and applying it little by little to the stock, and dressing said bodies of high speed steel to form cutting edges.

2. The method of manufacturing a composite tool of the type described which consists in forming the stock with grooves by fusing the surfaces of the stock and melting the high speed steel to fluidity by means of a gas flame and applying it little by little to the stock, welding bodies of high speed steel into said grooves, cutting away parts of the high speed steel bodies and adjacent portions of the stock to provide teeth tipped with high speed steel.

3. The method of manufacturing a composite tool of the type described which consists in forming the stock with grooves, welding bodies of high speed steel into said grooves, cutting into the bodies of high speed steel lengthwise of the same on lines radial with respect to the axis of the tool, and removing parts of said high speed steel bodies and adjacent portions of the stock to provide teeth tipped with high speed steel.

4. The method of manufacturing a composite tool of the type described which consists in forming the stock with grooves, melting the high speed steel and the grooved surfaces of the stock by means of a high temperature gas flame and flowing the high speed steel into the grooves under conditions which exclude air from contact with the molten metal, and dressing the bodies of high speed steel to provide cutting edges.

5. The method of manufacturing a composite tool of the type described which consists in forming the stock with grooves, melting high speed steel and the grooved surfaces of the stock and flowing the high speed steel into said grooves under conditions which exclude air from contact with the molten metal, and cutting away parts of the high speed steel bodies and adjacent portions of the stock to provide teeth tipped with high speed steel.

6. The method of making a composite pipe tap composed of a relatively soft metal stock and high speed steel cutting edges, which consists in forming the stock with longitudinal grooves, welding high speed steel into said grooves, threading the portion of the blank provided with the high speed steel bodies, and cutting away on longitudinal lines parts of the high speed steel bodies and adjacent portions of the stock.

7. The method of making a composite pipe tap composed of a relatively soft metal stock and high speed steel cutting edges which consists in forming the stock with longitudinal grooves, melting the high speed steel and the grooved surfaces of the stock and flowing the high speed steel into the grooves under conditions which exclude air from contact with the molten metal, threading the portion of the blank provided with high speed steel bodies, and cutting away parts of the high speed steel bodies on longitudinal lines and adjacent portions of the stock to provide a series of continuously threaded teeth.

8. A composite tool comprising a stock of relatively soft material having united thereto a plurality of longitudinally extending bodies of high speed tool steel circumferentially arranged around and welded to said stock and formed with grooves formed around the tool on a spiral line.

DANIEL P. KELLOGG.

---

It is hereby certified that in Letters Patent No. 1,327,101, granted January 6, 1920, upon the application of Daniel P. Kellogg, of Los Angeles, California, for an improvement in "Composite Tools of the Revoluble Type and Methods of Making the Same," errors appear in the printed specification requiring correction as follows: Page 2, claim 2, line 122, beginning with the word "by" strike out all to and including the word "stock," line 126; same page and claim, line 127, after the word "grooves" insert the words and comma, *by fusing the surfaces of the stock and melting the high speed steel to fluidity by means of a gas flame and applying it little by little to the stock,;* and that the said Letters Patent should be read with these corrections therein that the same may conform to the record of the case in the Patent Office.

Signed and sealed this 17th day of February, A. D., 1920.

[SEAL.]

M. H. COULSTON,
*Acting Commissioner of Patents.*

Cl. 76—101.